A. FUCHS & F. TILLMANNS.
HORSESHOE.
APPLICATION FILED JULY 1, 1910.

981,754.

Patented Jan. 17, 1911.

Witnesses:
John Murtagh
L. A. Murphy

Inventors:
Alois Fuchs and
Fritz Tillmanns

UNITED STATES PATENT OFFICE.

ALOIS FUCHS, OF LEIPZIG-LINDENAU, AND FRITZ TILLMANNS, OF LEIPZIG-GOHLIS, GERMANY.

HORSESHOE.

981,754.  Specification of Letters Patent.  Patented Jan. 17, 1911.

Application filed July 1, 1910. Serial No. 569,883.

*To all whom it may concern:*

Be it known that we, ALOIS FUCHS, a subject of the Emperor of Austria-Hungary, and a resident of 3 Burgauenstrasse, Leipzig-Lindenau, Germany, and FRITZ TILLMANNS, a subject of the Emperor of Germany, of 8 Fritzschestrasse, Leipzig-Gohlis. Germany, have invented a certain new and useful Horseshoe; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The horseshoes ordinarily used at present, are fastened by nails to the horse's hoofs. It has already been proposed with the object of avoiding the damage to the hoof caused by repeated nailing of horseshoes thereto, and of preserving it for a longer period, to nail a base plate to the hoof which is intended to be retained permanently thereon, and is designed to receive an outer plate forming the wearing part of the horseshoe.

Now the present invention has for its object to provide an improved horseshoe which shall obviate all of the disadvantages of existing nailed-on horseshoes and which will have also certain other advantages.

The improved horseshoe is designed to be fastened on the hoof in such a fast and immovable manner as to exclude the casting or any other unintentional falling off of the horseshoe.

Further the manner in which the improved horseshoe is fixed on and removed from the hoof, and the operations necessary for those purposes are so extremely simple, that a great saving of time is effected in shoeing a horse therewith, while injury and inconvenience to the animal are reduced to a minimum, if not prevented altogether.

One constructional form of this invention is illustrated by way of example in the accompanying drawings in which:—

Figure 1:
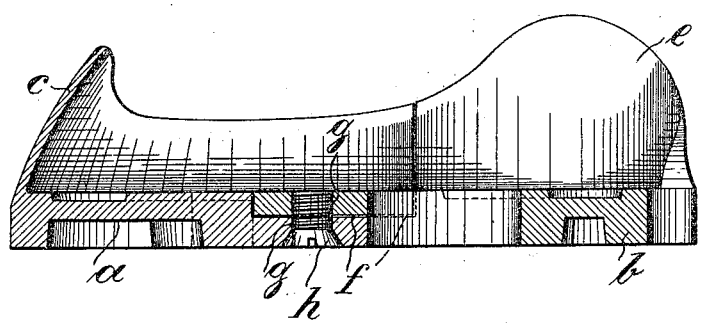
Figure 2:
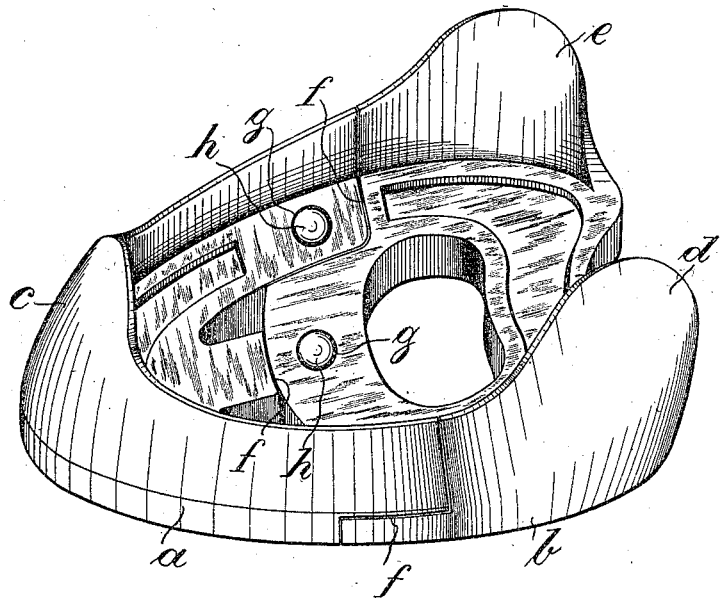

Figure 1 is a central longitudinal vertical section of the improved horseshoe, and Fig. 2 is a perspective view thereof.

In the example shown, the improved horseshoe comprises a forepart $a$ and a hindpart $b$. The part $a$ has an upwardly and inwardly inclined front wall $c$. The hindpart $b$ has two side cheeks $d$ and $e$. The parts $a$ and $b$ are formed with steps $f$, the step on the one part being adapted to overlap the step on the other part. The two parts $a$ and $b$ are connected together by sliding the parts against each other until the steps overlap, and holes $g$ formed in the latter, are coincident with each other whereupon screws $h$ are inserted in the holes $g$. The connection between the two parts $a$ and $b$ is thereby rendered firm and lasting, and the horseshoe can only be removed by unscrewing the screws $h$, which can be done in an exceedingly simple manner with the minimum inconvenience to the animal when it is desired to remove the shoe.

The improved horseshoe can be divided longitudinally, instead of transversely as shown in the example.

The middle part of the shoe with the center screw can be omitted if desired, or a greater number of screws may be employed.

The construction of the improved horseshoe may be further variously modified so long as the nature of the invention is preserved, namely as long as the horseshoe is made of two or more parts adapted to be slid into engagement with one another around the hoof in such a manner as with the aid of upwardly extending side portions to form a horseshoe which is held firmly and reliably together by means of one or more screws.

What we claim is:

1. In a horse-shoe, the combination of a one-piece front tread-part having rigidly secured thereto an inclined front wall and provided, at its rear part, with a plurality of steps; a one-piece rear tread-part separate from the front tread part having rigidly secured to its rear part upstanding side cheeks and, at its front part, steps adapted to underlap the steps of the front tread part; and screws passing through said steps to fasten the front and rear tread-parts together.

2. In a horse-shoe, the combination of a front tread-part having rigidly secured thereto an upstanding inclined front wall and provided, at its rear part, with a pair of overlapping side steps and an underlapping middle step; a rear tread part having rigidly secured to its rear part upstanding side-cheeks, and to its front part underlapping side steps and an over-lapping middle step adapted to underlap and overlap respectively the side and middle steps of the front tread part; and screws passing through the respective lapping steps.

3. In a horse-shoe, the combination of, a one-piece front tread part having an upstanding inclined front wall, side wings provided at the rear part with over-lapping steps, and a central tongue provided at its rear part with an under-lapping step; a rear tread-part having, at its rear part, upstanding side cheeks, and, at its front part, a cross-bar having side steps adapted to underlap the side steps of the front tread-part, and a middle-step adapted to over-lap the step of the central tongue; and screws passing through the respective lapping steps.

In testimony whereof we have affixed our signatures in presence of two witnesses.

ALOIS FUCHS.
FRITZ TILLMANNS.

Witnesses:
RUDOLPH FRICKE,
ALBERT R. MORAWETZ.